United States Patent
Zhang et al.

(10) Patent No.: US 10,035,894 B2
(45) Date of Patent: Jul. 31, 2018

(54) COLOURED TPU FOAM MATERIAL, PREPARATION METHOD AND USE THEREOF, AS WELL AS METHOD FOR PREPARING SHAPED BODY, SHEET AND SHOE MATERIAL BY USING SAME

(71) Applicant: JINJIANG GUOSHENG SHOE MATERIAL LTD., Fujian (CN)

(72) Inventors: Xiaohai Zhang, Fujian (CN); Wentao Zhai, Fujian (CN)

(*) Notice: Subject to any disclaimer, the term of this patent is extended or adjusted under 35 U.S.C. 154(b) by 205 days.

(21) Appl. No.: 15/105,020

(22) PCT Filed: Apr. 29, 2015

(86) PCT No.: PCT/CN2015/077763
§ 371 (c)(1),
(2) Date: Jun. 16, 2016

(87) PCT Pub. No.: WO2015/169164
PCT Pub. Date: Nov. 12, 2015

(65) Prior Publication Data
US 2016/0311993 A1   Oct. 27, 2016

(30) Foreign Application Priority Data

May 9, 2014   (CN) .......................... 2014 1 0196699

(51) Int. Cl.
| | |
|---|---|
| C08J 9/12 | (2006.01) |
| C08K 3/04 | (2006.01) |
| C08L 75/04 | (2006.01) |
| C08J 9/00 | (2006.01) |
| C08J 9/18 | (2006.01) |
| C08J 9/232 | (2006.01) |
| C08K 5/30 | (2006.01) |
| C08K 5/40 | (2006.01) |
| C08G 101/00 | (2006.01) |

(52) U.S. Cl.
CPC ............. *C08J 9/122* (2013.01); *C08J 9/0004* (2013.01); *C08J 9/0066* (2013.01); *C08J 9/18* (2013.01); *C08J 9/232* (2013.01); *C08K 3/04* (2013.01); *C08K 5/30* (2013.01); *C08K 5/40* (2013.01); *C08L 75/04* (2013.01); *C08G 2101/0066* (2013.01); *C08G 2410/00* (2013.01); *C08J 2203/06* (2013.01); *C08J 2205/044* (2013.01); *C08J 2205/052* (2013.01); *C08J 2205/06* (2013.01); *C08J 2207/00* (2013.01); *C08J 2300/22* (2013.01); *C08J 2300/26* (2013.01); *C08J 2375/04* (2013.01)

(58) Field of Classification Search
CPC ......... C08G 2101/0066; C08G 2410/00; C08J 9/0004; C08J 9/0066; C08J 9/122; C08J 9/18; C08J 9/232; C08J 2203/06; C08J 2205/044; C08J 2205/052; C08J 2205/06; C08J 2207/00; C08J 2300/22; C08J 2300/26; C08J 2375/04; C08K 3/04; C08K 5/30; C08K 5/40; C08L 75/04
See application file for complete search history.

(56) References Cited

U.S. PATENT DOCUMENTS

2002/0193459 A1* 12/2002 Haseyama ............ B29C 44/348
521/155

FOREIGN PATENT DOCUMENTS

CN   102229709   * 11/2011

* cited by examiner

*Primary Examiner* — John M Cooney
(74) *Attorney, Agent, or Firm* — Prakash Nama; Global IP Services, PLLC (57) ABSTRACT

Disclosed are a colored TPU foam material, a preparation method and a use thereof, as we as a method for preparing a shaped body, a sheet and a shoe material by using same. The colored TPU foam material is composed of colored foam particles or colored foam sheets; the concentration of a pigment in the colored foam particles or the colored foam sheets is 0.01-5 wt %; the pigment has the same concentration inside and outside the colored TPU foam material, and the colored TPU foam material has a hardness of shore A 5-65, a density of 0.05-0.5 g/cm³, and an average cell size of less than 100 μm. The present invention has features such as a good internal and external color uniformity, no wrinkles being present on the surface, etc.

6 Claims, 6 Drawing Sheets

FIG.8

COLOURED TPU FOAM MATERIAL, PREPARATION METHOD AND USE THEREOF, AS WELL AS METHOD FOR PREPARING SHAPED BODY, SHEET AND SHOE MATERIAL BY USING SAME

BACKGROUND OF THE INVENTION

The present invention is involved in a preparation method of low-density color TPU foam by using compressed fluid as physical blowing agent. The obtained color TPU foam exhibits uniform pigment dispersion within polymer matrix, which is achieved by shortening the heating time of the as impregnated color TPU resin under low-temperature and high-pressure fluid, with the aim to reduce the interface migration of organic pigment molecules. The prepared color TPU foam has smooth surface, which is achieved by a gas compression process by reducing the pressure difference between inside and outside of cell structures, with the aim to prevent the non-uniform material shrinkage. The present invention is involved in the sintering of TPU bead foam and the slicing and compression molding of TPU foamed sheet, and the obtained foam material can be used in footwear applications.

Ethylene-vinyl acetate copolymer (EVA) loam is lightweight, flexible, and thus is used as insole, midsole, and outsole of sporting shoes. Color EVA foam endows sporting shoes with rich color configuration and fashion design ability. The preparation method of color EVA foam has been disclosed. One method is that mixing pigment with EVA particles, additives, fillers, chemical blowing agent, cross-linking agents together at low temperature, extruding them into small particle, foaming them within mold by heating, and thereby producing color EVA foam shoes. Another method is that putting the pigment into the EVA foaming system, and the foamed color EVA foam is obtained by injection foaming method. This method is well used for producing EVA foam sandals.

The used EVA resin for producing EVA foam is thermoplastic, which can be prepared into a desired shape by melt processing. However, the chemical crosslinking is required during EVA foaming, and the formed crosslinking chain structure can not be melt processed anymore. In addition, the used chemical blowing agent during EVA foaming usually produces toxic gases, thus the production process of EVA foam is non-environmental friendly; the residual chemical blowing agent leads to the properties instability of EVA foam.

Thermoplastic polyurethane (TPU) resin has the advantages of high wear resistance, high elasticity, fatigue resistance, chemical corrosion and so on, and is widely used in shoes. Color TPU foam is expected to replace color EVA foam to use in the high-performance shoes field.

The prior art can not prepare TPU foam with a rich and bright colors, with an uniform color distribution within and outside of material, with a low density of 0.05-0.5 g/cm$^3$, with a uniform cell structure with the cell size less than 100 μm, and with the smooth surface without any wrinkles.

The method for preparing TPU foam by using a chemical blowing agent is known. The addition of pigments endows TPU foam with various color, but there are similar problems with the EVA foam, such as the requirement of chemical crosslinking and the presence of non-environmental friendly issues. In addition, the TPU foam prepared by using chemical blowing agent has others disadvantages such as rough cell structure, high density, and low expansion ratio.

In order to eliminate these mentioned drawbacks, Patent WO2000/44821 A, WO2004/108811A discloses the preparation method of TPU foam by using the expandable microspheres. During the processing, TPU resin in the form of powder or particle is mixed with expandable microspheres, and then carries on compression molding foaming to produce TPU foam. The microspheres are kinds of adhesion agent, or wax, or thermoplastic pellet wrapped with low boiling point solvent such as pentane inside. During the processing, the low boiling point solvent acts as the blowing agent to induce the formation of cell structure. The size of expandable microsphere is usually in the range of 20-40 μm, and they are difficult to well disperse into TPU matrix during the processing, and non-uniform cell structure is usually generated in TPU foam especially at high microsphere loading. For TPU foam with density of 0.3-1.0 g/cm3, the visible sag can be observed. Meanwhile, the as-prepared TPU foam exhibits poor wear resistance. The addition of pigments induces the formation of color TPU foam, but the prepared color TPU foam exhibits the similar problems, such as too large cell structure, coarse material surface, poor abrasion resistance property. Moreover, the prepared color TPU foam by this method does not possess the bright color.

Patent WO20051066250A, WO2007/082838A, WO2010/136398A and CN103642200A described the preparation method of TPU foam by using autoclave and the organic solvent or inert as was used as physical blowing agent. The as-prepared TPU foam has small cell size, uniform cell structure distribution, low density up to 0.1-0.5 g/cm3, which solves the technical problems associated with the microsphere foaming method. However, the autoclave foaming method involves a cooking process of TPU granules within hot water with temperature of 100-150° C. and time of 0.5-10 h. TPU resin especially for the polyester-typed TPU resin is susceptible to degrade after long time water boiling, which affect the properties and sample appearance of TPU foam. More importantly, the organic molecular pigments are usually selected for TPU dyeing, and the organic molecular is prone to migrate under foaming agent plasticization long time hot water boiling, leading to the occurrence of color fading.

Patent WO2007/082838A discloses a preparation meth of TPU foam by continuous extrusion foaming and underwater pelletization system. In this method, the saturated aliphatic hydrocarbons are the physical blowing agents and thus have the environmental problems and safety issues. The organic pigment is one kind of plasticizer, its addition usually decreases melt viscosity and melt strength, and thus reduce the foaming ability of TPU. Moreover, high open cell content will be generated during TPU extrusion foaming, leading to the occurrence of high shrinkage of TPU bead foam during sintering.

High pressure fluid such as high pressure CO2 is a clean, cheap and environmentally friendly physical blowing agent. At different conditions, high pressure CO2 fluid can be a gas fluid, a liquid fluid, and a supercritical fluid. The supercritical state of CO2 can be achieved under relatively mild condition, such as pressure of 7.31 MPa and temperature of 31.0° C.

Patent WO2002/4628A describes a preparation method of high-density TPU foam using high-pressure fluid or supercritical fluid as blowing agent. The as-prepared TPU foam by this method has a hardness no less than 90 and density of 0.5-1.0 g/cm$^3$, and it can be used as polishing pad of semiconductor wafer, but not can be used as footwear foam.

Patent CN102229709A describes a preparation method of TPU foam by using supercritical $CO_2$ as a blowing agent. In this method, the used pressure is about 5-25 MPa, temperature of 100-250° C., and the treatment time of 1-60 min. Colored TPU foam can be prepared by using this method in theory, but the organic pigments is easy to immigrate under high temperature and pressure, leading to the occurrence of color fading. Furthermore, the applied high pressure in this method results in high equipment costs and safety issue. Moreover, this technique does not use a dispersion medium, TPU particles under high temperature and high pressure is easily deformed, the appearance becomes sticky, therefore, this technique is not suitable for the preparation of smooth, spherical or ellipsoidal shaped TPU foams.

International papers (Journal of Applied Polymer Sciences, 2010, 116, 1994; Journal of Applied Polymer Science, 2013, 128, 2245.) reported the preparation method of thermoplastic elastomer by using high pressure CO2 as blowing agent. In this method, thermoplastic elastomer was soaked by high pressure CO2 under low temperature, and the soaked materials were foamed by heating within water batch or steam. Thermoplastic elastomer possess high free volume and soft matrix, high CO2 diffusion rate leads to the occurrence of serious volume shrinkage of the foamed material up to 40-50%. The phenomenon is not only increasing the foam density but also inducing the formation surface folding, and thus affects its application.

BRIEF SUMMARY OF THE INVENTION

The present invention is to provide a color TPU foam material preparation, selection of clean, cheap, environmentally friendly high pressure $CO_2$ fluid is a physical blowing agent, through continuous melt extrusion granulation/slab, high pressure fluid dipping, dissolved balance, once heated foam, foam reheating contained pressure treatment process, a small degree of shrinkage was prepared, the outer surface smooth, regular shape, the cell structure is 100% closed cell, the cell size of less than 100 μm, the pigment distribution in the foamed material of the inner and outer colored particulate material and the foamed TPU, TPU colored foam sheet material. Foamed particles forming machine, by steam heating to form an adhesive between the foamed particles, the foamed particles to obtain colored TPU molded material, the molded body has a low density, low shrinkage, good appearance of the molded article, the beads good interfacial adhesion characteristics. Chopper sponge rubber, TPU can be colored split foamed sheet was cut, the color due to the small size of the foamed TPU prepared, the pigment distribution in the foamed material inside and outside the prepared color TTO split sheet uniformly texture, color distribution uniform. Using the molding process, by pressing the color TPU can be plastically deformed foam sheet prepared by the complex shape of the foamed TPU parts. The preparation of colored TPU molded foamed particles, colored TPU foam split-colored TPU foam molding can be used in sports shoes shoe art.

TPU is a polyisocyanate, polyester polyols or polyether polyol, chain extender agent synthesis of a class of thermoplastic elastomer material. Polyisocyanate ester many species, but the maximum yield of only two, that is, diphenyl methane diisocyanate (MDI) and toluene diisocyanate (TDI). Many types of polyols, including polyester polyols, polyether polyols, polycarbonate polyols, polyolefin polyols, polyacrylate polyols and the like. Glycols such as butylene glycol, ethyleneglycol, propylene glycol, etc. as a chain extender. Currently, TPU resin can provide many types, different hardness, different melt flow index, with different chemical structures, different physical properties and the like on the market, which has facilitated the preparation of suitable colored TPU foam.

According to Wikipedia, the so-called color pigment is to make the material infected material. Display color pigment reason, that they can reflect or absorb certain wavelengths of visible colors. Pigments are mainly divided into organic and inorganic pigments. Inorganic pigments are generally mineral substances, organic pigments are generally derived from plants, marine animals, or organic synthesis. TPU resin is mainly an organic pigment to dye small molecules are known. TPU resin processing temperature is not lower than 180° C., which requires small organic molecules pigment temperature resistance are generally more than 180° C. Inorganic pigments generally have high temperature resistance, but often contain lead, mercury, chromium, cadmium and other heavy metals, there are environmental issues, followed by the presence of stained bright enough problems inorganic pigments. Organically modified carton black or carbon black is TPU resins commonly used black pigment, it does not contain lead, mercury, chromium, cadmium and other heavy metals, there is no environmental issues. Organically modified titanium dioxide or titanium dioxide is a white pigment TPU resins commonly used, it does not contain lead, mercury, chromium, cadmium and other heavy metals, there was no environmental issues.

The organic pigments are generally small molecules, it is mainly in the form of the pigment present in the polymer molecules in an amorphous region, the characteristic size of the free volume of the polymer matrix size, the pigment molecule, the pigment by the degree of influence of the action of water, etc. determines the color of the migration behavior of organic pigments. Temperature will increase the size of the free volume of the polymer and improve exercise capacity pigment molecule, organic pigment molecules at a high ambient temperature is more prone to color migration. The high-pressure fluid as a blowing agent to TPU resin substrate has a strong plasticizing effect, which increases the mobility of the molecular chain TPU resin also increases the ability of the interface to the organic pigment molecule diffusion. Organic pigments are generally easy-to-absorbent, TPU resin pigments in the case boiled prone interlace migration. Suspension process described above causes a uniform color distribution of the color material is difficult to prepare foamed TPU.

Our study found that the pigment molecules do not occur at low temperatures, high pressure fluid situation impregnated color migration. Further found that low-temperature, high-pressure fluid is colored TPU resin impregnated after the migration of the color is not significant in the case of occurrence of a short vapor boiled or cooked, color TPU foam material prepared in this way in the cell structure inside and outside with a uniform color distribution.

TPU resin at a lower temperature to the presence of the rubbery state, the large size of the free volume of the polymer, TPU-pressure fluid after the impregnated foam when heated, the internal high pressure fluid to rapidly diffuse out of the polymer matrix, and At the same time, the outside air begins to diffuse into the pore structure of the foam formed. Due to the high pressure fluid outward diffusion rate is much higher than the outside air to the TPU cell structure in diffusion rate, so that the cell structure of the cell outside pressure below atmospheric pressure difference. TPU resin is in a rubbery state at room temperature, the base softening effect caused by a pressure difference occurs TPU foam severely contracted and deformed, resulting in a large area of the sample surface dents. The polymer foam material, such as expandable polystyrene (EPS), expanded polypropylene (EPP) contraction occurs during the preparation of the common through prolonged aging, method of drying process to eliminate the shrinkage of the foamed materials are known, a. However, the study found that once TPU foam severely dent the surface, curing time, the drying processing method can not effectively eliminate sink marks TPU foam material. This study surprisingly found that by the shrinkage after the expansion is not introduced into the TPU material high pressure air or high pressure nitrogen gas method can effectively suppress non-uniform shrinkage of the foamed material TPU, TPU obtained smooth surface of the foamed material, there is no significant contraction marks.

Step inhibition TPU foam material is generally in the contraction pressure tank or pressure vessel is carried out Due to the large volume of the pressure tank or pressure vessel, using high-pressure aft at room temperature or high-pressure nitrogen is often easy to operate. The study found that when the temperature of 0~40° C., the pressure of high-pressure air carrier can effectively suppress the uneven shrinkage of TPU foam material.

The object of the present invention is to provide a color TPU foam material, in particular the hardness of the foamed material is Shao A5~65, a density of 0.05~0.5 g/cm$^3$, the cell size smaller than those of 100 μm, and they have a soft touch and excellent elasticity, and smooth with no wrinkles especially apparent, the pigment distribution in the foamed material and the inner and outer shoe can be applied to a colorful TPU foam.

In the present invention, the color TPU foam material comprises a color material and a color-expanded particles foamed TPU sheet material.

Wherein the pigment is containing red, yellow and blue, which formed different shades of color. The pigment that has a fluorescent effect also composed of red, yellow and blue which formed different shades of color.

Wherein the pigment contains small organic molecules of pigments and inorganic pigments, pigment is preferably a small organic molecule. And the thermal stability of the small organic molecules is higher than 180° C.

When the pigment is black, that carbon black is preferred as a pigment. If necessary, the organic-modified carbon black is preferred as a pigment; When the pigment is white, the titanium dioxide is preferably pigment, if necessary, the organic-modified titanium dioxide is preferred as a pigment.

Wherein the pigment in the inner and outer of color TPU foam material which laving the same/similar concentrations.

The content of wherein the pigment in the TPU foamed material is 0.01~5 wt %, preferably 0.1~3 wt %, and more preferably 0.2~2 wt %.

The present invention relates to a method for the preparation of color TPU foamed particulate material, that includes the following steps:

1) The pigment premixed with TPU particles, then the premixed particles was manufactured to be colored TPU pellets, which were extruded by extruder and underwater pelletizing.

2) The color TPU particles immersed in a high-pressure fluid, so that the high pressure fluid in the color TPU matrix reached dissolution equilibrium;

3) Placed the colored TPU particles that dissolved in the high pressure fluid reached balance in a water bath or steam heated to foam, obtained color TPU foam particles marked as B1;

4) Placed the color TPU foam particles into a closed container, and then the container was flushed with the high pressure it or high pressure nitrogen gas. So that the outside of the high pressure air or nitrogen replace with the high pressure fluid in color TPU foam particles. Finally, prepared color TPU foam particles was shrink uniformly and smooth surface, which marked as B2;

Wherein the color TPU particles are spherical and oval, ratio of the major axis and the minor axis direction is 1~3, and the diameter of minor axis is 0.5~5.0 mm.

Described as Step 2), the high-pressure fluid is $CO_2$ fluids. The pressure of the high pressure fluid is 1~10 MPa, the temperature of the high pressure fluid is 0~60° C., the solubility of the high pressure fluid in the color TPU is 8~30 wt %.

Step 3), the steam heating time 1~60 s.

As 75% of the ingredients of the air is nitrogen, it found that the high-pressure air or high-pressure nitrogen loading in the color TPU foam material which having a similar effect. Taking into account the cost of the operation, preferably the high pressure air. Step 4), the pressure of the high pressure air is 0.15~0.5 MPa, high-pressure air at room temperature.

In order to obtain a higher expansion ratio of the color TPU foamed particles material that can also be foamed by the process of heating to foam in the second time, including the steps:

1) The pigment premixed with TPU particles, then premixed particles by extrusion granulation, underwater pelletizer made of color TPU particles.

2) The color TPU particles immersed in a high-pressure fluid, so that the high pressure fluid in the color TPU matrix reached dissolution equilibrium;

3) Placed the color TPU particles that dissolved in the high pressure fluid reached balance in a water bath or steam heated to foam, obtained color TPU foam particles marked as B1';

4) Placed the color TPU foam particles as B1' on hot air heating, so as to continue to obtain a color TPU foamed particles marked as B2', the hot air temperature of 100-140° C.;

5) Placed the color TPU foam particles as B2' into a closed container, and then the container was flushed with the high pressure air So that the outside of the high pressure air replace with the high pressure fluid in color TPU foam particles. Finally, prepared color TPU foam particles was shrink uniformly and smooth surface, which marked as B3';

Wherein the color TPU particles are spherical and oval, ratio of the major axis and the minor axis direction 1~3, and the diameter of minor axis is 0.5~5.0 mm.

Described as Step 2), the high-pressure fluid is $CO_2$ fluids. The pressure of the high pressure fluid is 1~10 Pa, the temperature of the high pressure fluid is 0~60° C., the solubility of the high pressure fluid in the color TPU is 8~30 wt %.

Step 3), the steam heating time 1~60 s.

Step 4), Using hot air to the secondary foam to obtain a color TPU marked as B3', the hot air treatment time is 1~60 s, the hot air temperature of 100-140° C.

As 75% of the ingredients of the air is nitrogen, it found that the high-pressure air or high-pressure nitrogen loading in the color TPU foam material which having a similar effect. Taking into account the cost of the operation, preferably the high pressure air. Step 4), the pressure of the high pressure air or nitrogen is 0.15~0.5 MPa, high-pressure air at room temperature.

The present invention is also involved in the molding of color TPU foamed particles.

EPS, EPP achieved by steam molded foam particles that are known, which can be carried out by steam molding machine. Their different is the latter the molding that requires a higher vapor pressure. When EPS, EPP foam particles used steam molding machine, the water vapor is heating medium. EPS, EPP foam particles are heated to soften the surface in the heating water vapor, and molecular chain happens interfacial diffusion on the surface of EPS, EPP foam particle, thereby forming a bond between the foam particles. Our research found that is possible to prepare the color TPU foam particles of molded materials by using EPP molding machine equipment. Steam molded color TPU foamed particles that comprising the steps of:

1) Placed the color TPU foam particles in the injection molding machine. And using steam to heat treatment, then the cold water cooling, drainage, air cooling and demolding to obtain the colored thermoplastic molded foam particles.

We have found that color TPU foam particles does not cause a short color migrating by high temperature steam heating. Prepared the color TPU foam particles of molded material which having a uniform color.

Steam heating time of 10~60 s, the steam temperature is 120~149° C.

In order to achieve good product design effect, the color TPU foam particles of molded material may include one or more colors. Wherein the color TPU foam of molded material is one or more colors of TPU foam mixture by steam molding, or one or more colors of thermoplastic elastomer foamed particles binding in a certain sequence by steam molding.

The steam machine can achieve a multi-mold cavity and molding cycle is short, which have a high molding efficiency.

Colorful and various forms TPU foam particles of molded material can be prepared by steam molding technology. It is suitable for the preparation of the cushioning material, and especially suitable for the manufacture of sports shoes, casual shoes, sandals and shoes material of slippers.

Wherein the hardness of the color TPU foam particles of molded material is Shao A5~65, a density of 0.05~0.5 g/cm$^3$.

The present invention also relates to a method for preparing a color TPU foam sheet material, comprising the steps of:

1) The pigment premixed with TPU particles, then the premixed particles was manufactured to be color TPU sheet, which were extruded by extruder, cast or molded.

2) The color TPU sheet immersed in a high-pressure fluid, so that the high pressure fluid in the color TPU sheet reached dissolution equilibrium;

3) Placed the color TPU sheet that dissolved in the high pressure fluid reached balance in a water bath heated to foam, obtained color TPU foam sheet marked as B1";

4) Placed the color TPU foam sheet as B1" into a closed container, and then the container was flushed with the high pressure air. So that the outside of the high pressure air replace with the high pressure fluid in color TPU foam sheet. Finally, prepared color TPU foam sheet was shrink uniformly and smooth surface, which marked as B2";

Wherein the thickness of the color TPU foam sheet is 0.5~30 mm.

Wherein the hardness of the color TPU foam sheet is A5~65.

The cell structure of the color TPU foam sheet is 100% closed cell structure, the cell size of less than 100 μm.

Described as Step 2), the high-pressure fluid is $CO_2$ fluids. The pressure of the high pressure fluid is 1~10 MPa, the temperature of the high pressure fluid is 0~60° C., the solubility of the high pressure fluid in the color TPU is 8~30 wt %.

Step 3), the steam heating time 1~60 s.

Step 4), the pressure of the high pressure air is 0.15~0.5 MPa, high-pressure air at room temperature.

The present invention further relates to a color TPU foam sliced.

The sponge cleaver on split-technology that is known. Our research found that the hardness of the color TPU foam sliced is A5~65, which is very fit to use a sponge chopper to split processing. The cell structure of the colored TPU foam sliced is less than 100 μm and the pigment in the foamed material having a uniform dispersion of both inside and outside, so that the obtained colored TPU foam sliced that have a good appearance and uniform color distribution. The colored TPU foam sliced is suitable for making insole.

The thickness of the colored TPU foam sliced is 0:1~28 mm.

The present invention further relates to a colored TPU foamed sheet by compression molding.

The molding of EVA foamed be finalized once that the process is known. This process involves EVA foam material that occurs plastic deformation under the heat molded conditions and cooling stereotypes step to prepare a variety of styles Shoes. The color TPU foam material is a thermoplastic, we found that by the method of heating the molding which will lead to the color TPU foamed material, which made into shoes.

The temperature of the molding is 130~170° C.

The present invention has the following advantages:

The present invention uses the process that is low-temperature, high-pressure CO2 fluid dipping and short time heating foam. It is effectively preventing pigment migration interface and suppress the uneven shrinkage of TPU team material by high-pressure air through the load voltage and other technical means, thereby to obtain a surface finish and no significant contraction marks, colors inside and outside of the cell structure uniformity and high degree of expansion, small cell size color TPU foam.

The present invention uses high-pressure fluid as a foaming agent, the production process is environmentally friendly, the preparation process is simple, easy to operate, easy to industrial production, prepared color TPU foam particles molded material is low density, low shrinkage, dimensional stability is well. Prepared color TPU foam sliced material has excellent texture smooth, uniform color distribution and prepared color TPU molding products has a clear and stable shape structure.

Color TPU foam method of the invention not only has a wealth of low density, soft touch, but also has the unique property of TPU resins such as excellent resilience, low permanent deformation, excellent wear and good chemical stability.

As an example, the color TPU foam material of the present invention that may be a film, a sheet, a buffer component, shoe soles and other parts of the form to use. According to the present invention, the preferred soles and insoles.

The present invention is described in more detail in the following examples.

DETAILED DESCRIPTION OF THE INVENTION

To further explain the technical solution of the present invention, the present invention is explained in detail through the following specific embodiments.

Example 1

Figure 1:
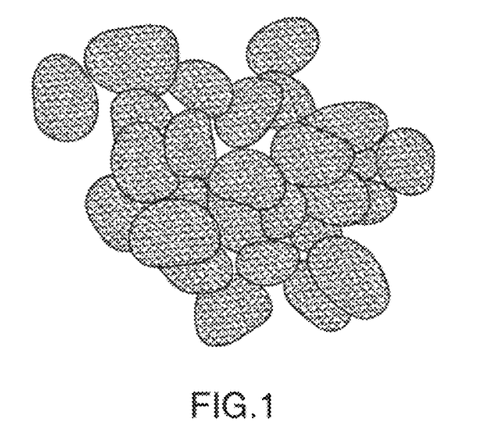
FIG. 1 is a optical schematic view of the yellow TPU foam particles prepared in Example 1.
Figure 2:
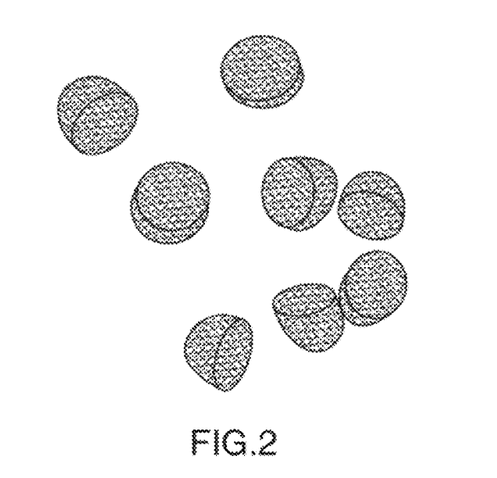
FIG. 2 is a optical schematic view of the section of yellow TPU foam particles prepared in Example 1.
Figure 3:
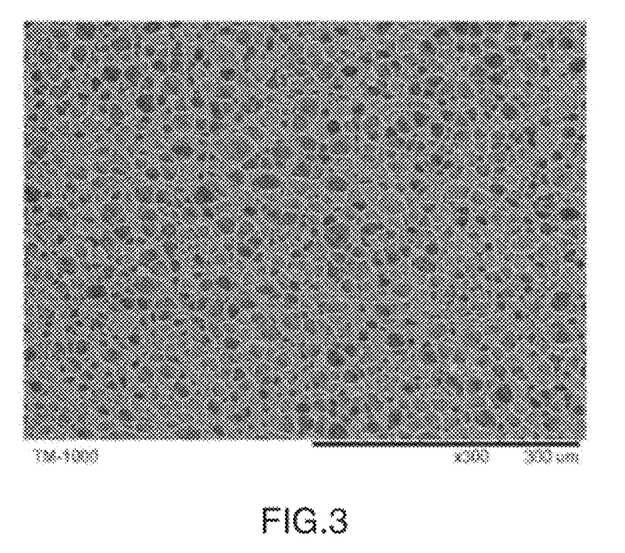
FIG. 3 is a electron microscope schematic view of the section of yellow TPU foam particles prepared in Example 1.

The TPU particles (produced by Ningbo Jinsul) and 1 wt % yellow organic pigment (Permanent yellow HR) were dry blended by the extruder, an underwater pelletizer and then that can be made into a diameter of 2 mm, an aspect ratio of 1.5 ellipsoid TPU particles. The particles are placed in an autoclave, use the low-temperature high-pressure $CO_2$ fluid dipping TPU particles at high pressure, and the fluid $CO_2$ dissolved in the TPU resin particles that reach to equilibrium. Placed the impregnated TPU particles in a water bath or steam heated to foam, obtained color TPU foam particles marked as B1. Placed the TPU foam particles as 81 at room temperature, high-pressure air contained in the pressure to obtain the yellow TPU foam particles marked as 82, Table 1 is Example 1 related process parameters. Studies have shown that the density of prepared yellow TPU foam particles is 0.18 $g/cm^3$, a hardness of A15. Shown in FIG. 1, obtained yellow TPU foam particles as a single ellipsoidal, smooth surface, there is no obvious shrinkage marks. Shown in FIG. 2, obtained the yellow TPU foam particles as a 100% closed cell structure, an average cell size of 15 microns. Shown in FIG. 3, the interface section yellow TPU obtained expanded particles are yellow, and the yellow pigment is uniformly distributed in the inner and outer materials.

Comparative Example 1

Figure 4:
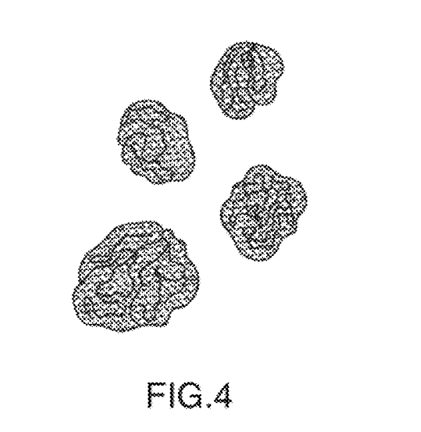
FIG. 4 is a optical schematic view of the yellow TPU foam particles prepared in Comparative Example 1.

In addition to the TPU foam particles were not contained in the pressure treatment, the other operation is the same as in Example 1, the density of prepared yellow TPU foam particles is 0.45 $g/cm^3$. Shown in FIG. 4, the surface of prepared TPU foamed particles occurs significant wrinkles and a large area of the depression.

Comparative Example 2

Reference the process of CN10229709A for preparing color TPU foam particles. Placed the yellow TPU particles into the autoclave of temperature is 120° C., through the high-pressure $CO_2$ fluid at pressure of 8 MPa, and impregnated TPU particles for 1 h, 2 h, 3 h, 4 h, 6 h, 12 h. Then rapid relief-pressure to obtain TPU foam material. Prepared the TPU foam material was irregular lumps or flakes, and the individual TPU foam particle can not be distinguished, while the large size cell structure of the sample was observed to appear on the surface. Whereby, impregnated for 1 h, 2 h, 3 h, 4 h to foam which obtained irregularly TPU foam was pale yellow, density respectively was 0.52, 0.54, 0.48, 0.45 $g/cm^3$. Wherein impregnated for 6 h, 12 h to obtain the irregularly TPU foam was dark yellow. It may be described that TPU resins occurs chemically degrade, the density of the prepared TPU foam was 0.61 $g/cm^3$.

Comparative Example 3

Figure 5:
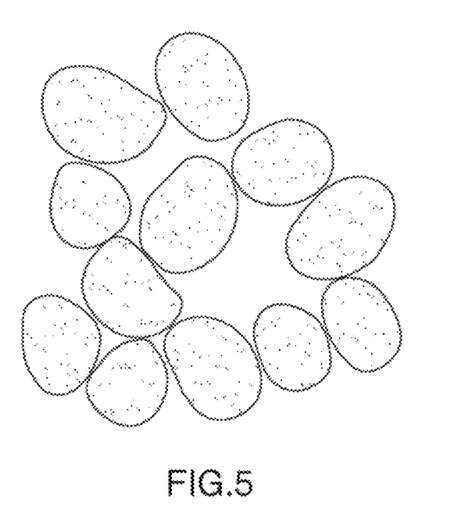
FIG. 5 is a optical schematic view of the low TPU foam particles prepared in Comparative Example 3.

Reference WO2005/066250, WO2007/082838, WO20101136398 for preparing color TPU foam particles. Placed the yellow TPU particles and the dispersant into the autoclave in a water bath with stirring, the yellow TPU particles suspended in a water bath, and the bath temperature was 120° C. Through 20% of the butane being a blowing agent, impregnated yellow TPU particles were 1 h, 2 h, 3 h, 4 h under stirring state, and then rapidly relieving to obtain TPU foam particles material. As shown in FIG. 5, wherein impregnated the TPU particles for 1 h and 2 h that obtained the TPU foam particles was non-uniform light yellow, the density of 0.20 $g/cm^3$. Impregnated the TPU particles for 3 h and 4 h that obtained the TPU foam particles was non-uniform dark yellow. It may be described that TPU resins occurs chemically degrade, the density of the prepared TPU foam was 0.18 $g/cm^3$.

Comparative Example 4

Reference the process of CN103642200A for preparing the color TPU foam particles. Placed the yellow TPU particles into the autoclave of temperature is 120° C., through the high-pressure $CO_2$ fluid at pressure of 8 MPa, and impregnated TPU particles for 1 h, 2 h, 3 h, 4 h. Then rapid relief-pressure to obtain TPU foam material. Whereby, impregnated the TPU particles for 1 h and 2 h that obtained the TPU foam particles was non-uniform light yellow, the density of 0.47 $g/cm^3$. Impregnated the TPU particles for 3 h and 4 h that obtained the TPU foam particles was non-uniform dark yellow. It may be described that TPU resins occurs chemically degrade, the density of the prepared TPU foam was 0.51 $g/cm^3$.

Example 2

In addition to changing the source of TPU resins (Purchase from Ningbo Golden Harvest, Yantai Wanhua, Dow Chemical Company, Bayer Company), granulation size and operating conditions, the other operation that is the same as in Example 1. Prepared yellow TPU foam particles are both smooth surface, no significant contraction. Both inside and outside the color TPU foam particles which having a uniform pigment distribution that can be observed from the incision. Specific data are shown in Table 1.

Example 3

In addition to changing the amount of the yellow organic pigment 0.1, 0.5, 1, 2.5 wt %, the other operation is the same as in Example 1. Prepared yellow TPU foam particles are both smooth surface, no significant contraction. Both inside and outside the color TPU foam particles which having a uniform pigment distribution that can be observed from the incision. Specific data are shown in Table 2.

Example 4

In addition to content of the pigment is increased to 3 wt %, the TPU foam particles B1' continued foaming by hot air for 30 s, the hot air temperature is 100-140° C., to obtain B2'. And after the pressure of the high pressure air contained to prepare B3', the other operation is the same as in Example 1. Prepared yellow TPU foam particles are both smooth surface, no significant contraction. Both inside and outside the color TPU foam particles which having a uniform pigment distribution that can be observed from the incision. Specific data are shown in Table 3.

Example 5

Figure 6:
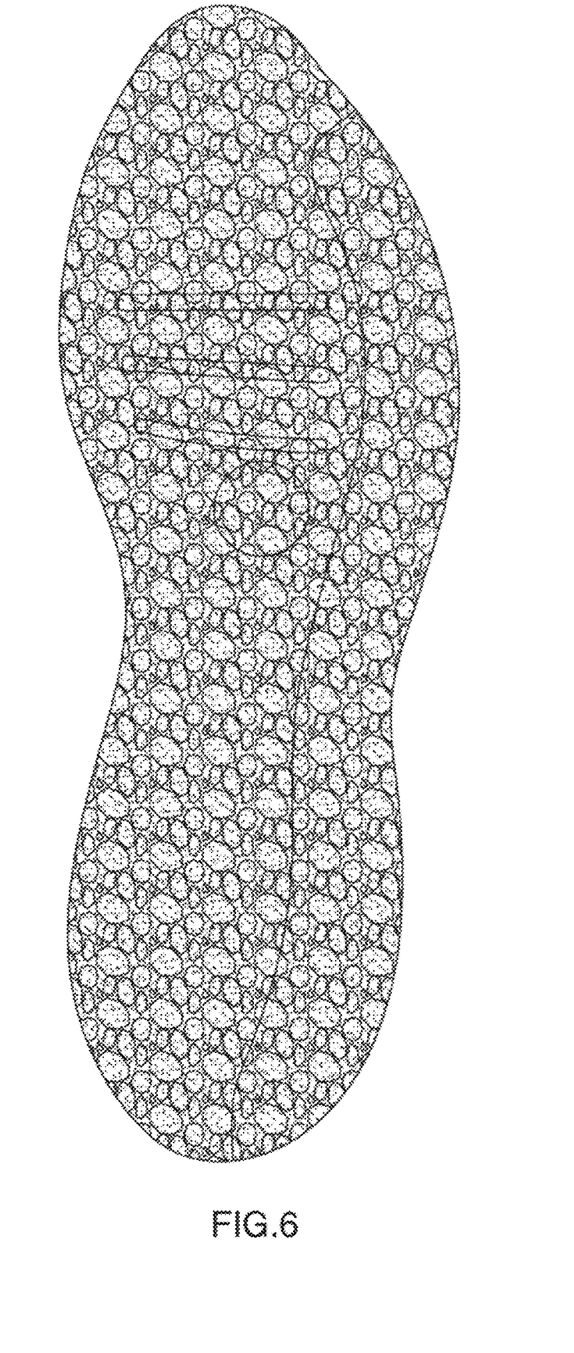
FIG. 6 is a optical schematic view of the yellow TPU foam particles of a molded product prepared in Example 5.

Placed the yellow TPU foam particles as B2 or B3' in the EPP foam particles molding machine of the shoe mold, then close the mold. And the water vapor was bubbled into the mold to heat the mold, then cooling the mold for cold water, drainage, blowing, open mold, to obtain the yellow TPU foam particles molded soles. Wherein the steam temperature is 138° C., the heating time for 40 s. As shown in FIG. 6, the yellow TPU foam particles molded material have a good interfacial on and the pigment distribution in the surface of the molding. Tests show that: the average density of the yellow TPU foam particles molded of soles is 0.29 g/cm$^3$, a hardness of A42.

Example 6

Figure 7:
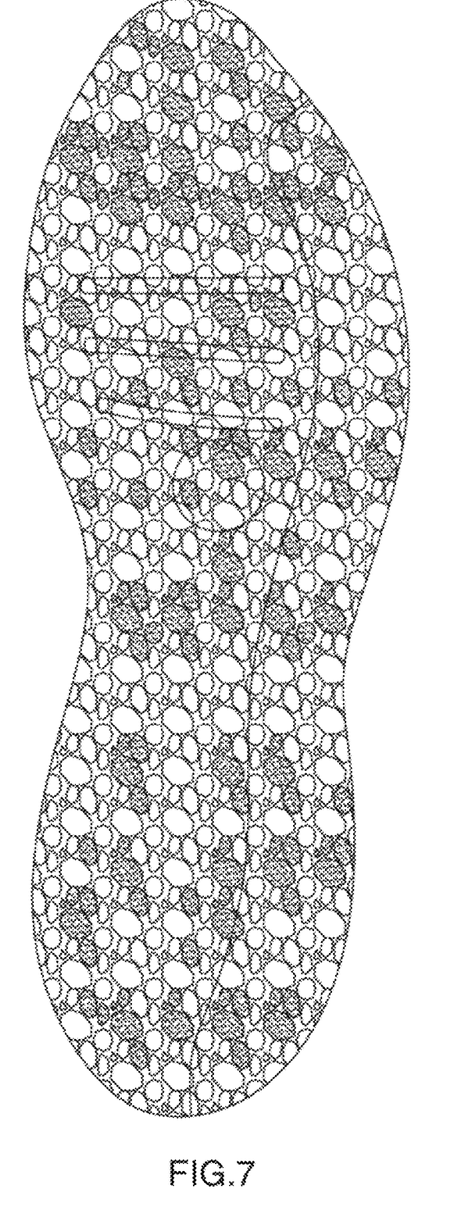
FIG. 7 is a optical schematic view of the yellow/white TPU mixed particles of a molded product prepared in Example 5.

The 20 wt % yellow and 80 wt % red and white TPU foam particles injected into the EPP foam particles molding machine of the shoe mold, then close the mold. And the water vapor was bubbled into the mold to heat the mold, then cooling the mold for cold water, drainage, blowing, open mold, to obtain the yellow TPU foam particles molded soles. Wherein the steam temperature is 145° C., the heating time for 10 s. As shown in FIG. 7, the mixed color TPU foam particles molded material have a good interfacial bond, and the pigment did not occur significantly migration in the TPU foam particles. Tests show that: the average density of the mixed color TPU foam particles molded of soles is 0.36 g/cm$^3$, a hardness of A45.

Example 7

Figure 8:
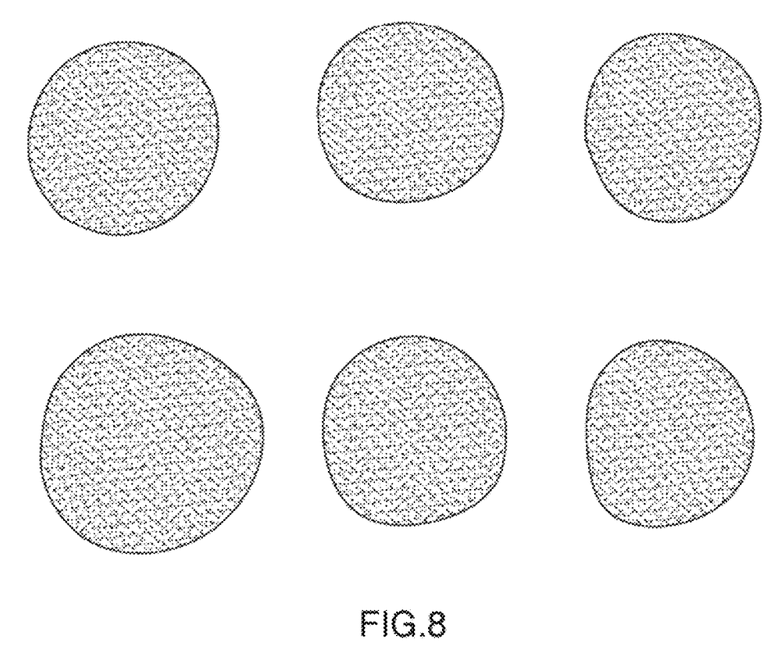
FIG. 8 is an optical schematic diagram of the process for preparing 7 colored TPU foam wafer embodiment.

The TPU particles (produced by Dow Chemical) and 1 wt % pigment were dry blended by the extruder, molded into a color TPU sheet which having a thickness of 2 mm, and cut into wafers of 20 mm diameter. The color TPU wafers are placed in an autoclave, use the low-temperature, high-pressure $CO_2$ fluid dipping TPU particles at high pressure, and the fluid $CO_2$ dissolved in the TPU resin particles that reach to equilibrium. Placed the impregnated TPU particles in a water bath or steam heated to foam, obtained yellow TPU foam particles marked as B1. Placed the TPU foam particles as B1 at room temperature, high-pressure air contained in the pressure to obtain the yellow TPU foam discs marked as B2. In addition to changing the kind of the color of the pigment, the content of titanium dioxide is 3 wt %, other process parameters are the same as in Example 1. FIG. 8 shows the optical photo of the addition of titanium dioxide, carbon black, phthalocyanine blue, pigment fast scarlet, permanent yellow pigments, fluorescent green color obtained TPU foam. As shown in FIG. 8, prepared TPU foam had no significant contraction marks. Both inside and outside the color TPU foam particles which having a uniform pigment distribution that can be observed from the incision. Table 4 shows the color TPU wafer performance.

Comparative Example 5

In addition to the pigment is not added, the other operation is the same as Example 7. Prepared TPU foam are smooth surface, and no significant contraction of white TPU foam particles material. The color of TPU foam sheet obtained from Comparative Example 5 is dark that compared to the TPU foam sheet was added with titanium dioxide obtained from Example 7.

Example 8

In addition to the thickness of yellow TPU cast sheet is 15 mm, the other operation is the same as Example 7. Prepared the thickness of yellow Further, prepared TPU foam material was no obvious shrinkage mark, and both inside and outside the color TPU foam particles which having a uniform pigment distribution.

Example 9

Using the chopper with the rubber sponge on the hardness of A20, a thickness of 30 mm yellow TPU foam sheet which were split, and the thicknesses of TPU foam sliced is 0.2, 0.5, 1, 2, 5, 10 mm. Prepared the yellow TPU foam sliced was color uniform, homogeneous in structure, with smooth surface.

Example 10

Placed the thickness of 8 mm yellow TPU foam sheet into a temperature of 155° C. insoles mold, merging mold, hot pressing, water-cooled, open the mold, prepared yellow TPU foam insoles. The resulting yellow TPU foam shoes was colorful, homogeneous in structure, no significant contraction marks.

Example 11

Placed the upper thickness of 10 mm, under thickness of 3 mm trapezoidal fluorescent blue TPU foam insoles into a temperature of 175° C. shoe mold, merging mold, hot pressing, water-cooled, open mold, prepared fluorescent blue TPU sports shoes in the end. The resulting fluorescent blue TPU foam shoe was colorful, homogeneous in structure, no significant contraction marks.

TABLE 1

Preparation of process parameters and performance indicators of color TPU foam particles as shown in

| Example | Particles Size | Impregation Conditions | Foaming Time | Pressure | Density | Hardness | Cell Size | Color Degree |
|---|---|---|---|---|---|---|---|---|
| Example 1 | 2 mm, 1.5 | 5 MPa/0° C. | 30 s | 0.20 MPa | 0.21 g/cm$^3$ | A21 | 20 μm | moderation |
| Example 2 | 1 mm, 1.5 | 3 MPa/50° C. | 60 s | 0.15 MPa | 0.32 g/cm$^3$ | A32 | 18 μm | moderation |
| | 0.5 mm, 1.5 | 1 MPa/50° C. | 60 s | 0.15 MPa | 0.5 g/cm$^3$ | A64 | 6 μm | moderation |
| | 2 mm, 3 | 10 MPa/0° C. | 20 s | 0.40 MPa | 0.09 g/cm$^3$ | A7 | 72 μm | shallower |
| | 3 mm, 1.5 | 5 MPa/30° C. | 10 s | 0.50 MPa | 0.35 g/cm$^3$ | A37 | 20 μm | moderation |

TABLE 1-continued

Preparation of process parameters and performance indicators of color TPU foam particles as shown in

| Example | Particles Size | Impregation Conditions | Foaming Time | Pressure | Density | Hardness | Cell Size | Color Degree |
|---|---|---|---|---|---|---|---|---|
| | 4 mm, 1.5 | 8 MPa/60° C. | 5 s | 0.20 MPa | 0.28 g/cm$^3$ | A29 | 30 μm | moderation |
| | 5 mm, 1.5 | 10 MPa/60° C. | 30 s | 0.20 MPa | 0.18 g/cm$^3$ | A16 | 40 μm | moderation |

Performance Indicators of Different Yellow Pigment Content of Color TPU Foam Particles

| Pigment Content | Density | Hardness | Average Cell Size | Color Degree |
|---|---|---|---|---|
| 0.1 wt % | 0.22 g/cm$^3$ | A20 | 17 μm | shallower |
| 0.5 wt % | 0.20 g/cm$^3$ | A17 | 18 μm | moderation |
| 1 wt % | 0.18 g/cm$^3$ | A15 | 15 μm | moderation |
| 2 wt % | 0.16 g/cm$^3$ | A14 | 14 μm | moderation |
| 5 wt % | 0.12 g/cm$^3$ | A10 | 12 μm | darker |

TABLE 3

The effects of hot air foam secondary or not on the performance parameters of TPU foam particles

| Hot air foam or not | Density | Hardness | Average Cell Size | Color Degree |
|---|---|---|---|---|
| Example 1, none | 0.18 g/cm$^3$ | A15 | 15 μm | moderation |
| Example 4, yes | 0.07 g/cm$^3$ | A6 | 78 μm | moderation |

TABLE 4

The parameters of using different types pigment prepared color TPU foam sheet

| Pigment Color | Density | Hardness | Average Cell Size | Color Degree |
|---|---|---|---|---|
| permanent yellow HR | 0.18 g/cm$^3$ | A15 | 15 μm | moderation |
| permanent orange RL | 0.20 g/cm$^3$ | A17 | 20 μm | moderation |
| pigment fast scarlet 2R | 0.16 g/cm$^3$ | A15 | 18 μm | moderation |
| phthalocyanine blue BGS | 0.17 g/cm$^3$ | A13 | 17 μm | moderation |
| fluorescent green LP-9002 | 0.19 g/cm$^3$ | A13 | 17 μm | moderation |
| carbon black | 0.21 g/cm$^3$ | A21 | 20 μm | moderation |
| titanium dioxide | 0.25 g/cm$^3$ | A25 | 22 μm | uniform white |
| No added pigment | 0.20 g/cm$^3$ | A17 | 20 μm | white, darker |

The foregoing embodiments and the drawings are not limited to the shape and pattern of the product of the present invention, one of ordinary skill in the art relevant to any of its variations or modifications made to the appropriate, are to be regarded as not departing from the scope of the present invention patent.

What is claimed is:

1. A method for preparing a color thermoplastic polyurethane (TPU) foam material which comprises color TPU foam particles; the color TPU foam particles have a pigment; a concentration of the pigment in the color TPU foam particles is 0.01~5 wt %, the method comprises the following steps:

premixing the pigment with TPU particles, extruding the TPU particles premixed with the pigment, and then granulating the TPU particles premixed with the pigment underwater by using a pelletizer to obtain color TPU particles;

immersing the color TPU particles in a high-pressure fluid until equilibrium is reached between the high-pressure fluid and the color TPU particles;

after reaching the solubility equilibrium, heating and foaming the color TPU particles by placing the color TPU particles in a water bath or steam to obtain a semi-finished product of the color TPU foam particles;

placing the semi-finished product into a closed container, flushing in high pressure air into the container to replace the high-pressure fluid with the high pressure air such that the semi-finished product of the color TPU foam particles shrinks uniformly to obtain a final product of the color TPU foam particles having a smooth surface; wherein the high pressure air has a pressure of 0.15~0.5 MPa and a temperature which is a room temperature;

the color TPU foam material comprising the color TPU foam particles obtained through the above steps has a uniform concentration of the pigment from an inside of the color TPU foam material to an outer surface of the color TPU foam material; the color TPU foam material has a hardness of shore A 5-65, a density of 0.05-0.5 g/cm$^3$, and an average cell size of less than 100 μm.

2. A method for preparing a color thermoplastic polyurethane (TPU) foam material which comprises color TPU foam particles; the color TPU foam particles have a pigment; a concentration of the pigment in the color TPU foam particles is 0.01~5 wt %, the method comprises the following steps:

premixing the pigment with TPU particles, extruding the TPU particles premixed with the pigment, and then granulating the TPU particles premixed with the pigment underwater by using a pelletizer to obtain color TPU particles;

immersing the color TPU particles in a high-pressure fluid until a solubility equilibrium is reached between the high-pressure fluid and the color TPU particles, wherein the high-pressure fluid has a pressure of 1~10 MPa, and a temperature of 0~60° C.;

after reaching the solubility equilibrium, heating and foaming the color TPU particles by placing the color TPU particles in a water bath or steam to obtain a semi-finished product of the color TPU foam particles;

heating the semi-finished product of the color TPU foam particles using hot air, wherein a temperature of the hot air is 100-140° C.;

placing the heated semi-finished product into a closed container, flushing in high pressure air or nitrogen into the container to replace the high-pressure fluid with the high pressure air or nitrogen such that the heated semi-finished product of the color TPU foam particles shrinks uniformly to obtain a final product of the color TPU foam particles having a smooth surface; wherein the high pressure air or nitrogen has a pressure of 0.15~0.5 MPa and a temperature which is a room temperature;

the color TPU foam material comprising the color TPU foam particles obtained through the above steps has a uniform concentration of the pigment from an inside of the color TPU foam material to an outer surface of the color TPU foam material; the color TPU foam material has a hardness of shore A 5-65, a density of 0.05-0.5 g/cm$^3$, and an average cell size of less than 100 μm.

3. A method for preparing a color thermoplastic polyurethane (TPU) foam material which comprises a color TPU foam sheet; the color TPU foam sheet has a pigment; a concentration of the pigment in the color TPU foam sheet is 0.01~5 wt %, the method comprises the following steps:

premixing the pigment with TPU articles, extruding the TPU particles premixed with the pigment, and then casting or molding the TPU particles premixed with the pigment into a color TPU sheet;

immersing the color TPU sheet in a high-pressure fluid until a solubility equilibrium is reached between the high-pressure fluid, and the color TPU sheet, wherein the high-pressure fluid has a pressure of 1~10 MPa, and a temperature of 0~60° C.;

after reaching the solubility equilibrium, heating and foaming the color TPU sheet by placing the color TPU sheet in a water bath or steam to obtain a semi-finished product of the color TPU foam sheet;

placing the semi-finished product into a closed container, flushing in high pressure air into the container to replace the high-pressure fluid with the high pressure air such that the semi-finished product of the color TPU foam sheet shrinks uniformly to obtain a final product of the color TPU foam sheet having a smooth surface; wherein the high pressure air has a pressure of 0.15~0.5 MPa and a temperature which is a room temperature;

the color TPU foam material comprising the color TPU foam sheet obtained through the above steps has a uniform concentration of the piggy ent from an inside of the color TPU foam material to an outer surface of the color TPU foam material; the color TPU foam material has a hardness of shore A 5-65, a density of 0.05-0.5 g/cm$^3$, and an average cell size of less than 100 μm.

4. The method of claim 1, wherein the high-pressure fluid is as $CO_2$ fluid, a solubility of the high-pressure fluid in the color TPU particles is 8~30 wt %.

5. The method of claim 2, wherein the high-pressure fluid is a $CO_2$ fluid, a solubility of the high-pressure fluid in the color TPU particles is 8~30 wt %.

6. The method of claim 3, wherein the high-pressure fluid is a $CO_2$ fluid, a solubility of the high-pressure fluid in the color TPU sheet is 8~30 wt %.

* * * * *